United States Patent
An et al.

(10) Patent No.: US 12,542,239 B2
(45) Date of Patent: Feb. 3, 2026

(54) MULTILAYER ELECTRONIC COMPONENT AND METHOD FOR MANUFACTURING MULTILAYER ELECTRONIC COMPONENT

(71) Applicant: SAMSUNG ELECTRO-MECHANICS CO., LTD., Suwon-si (KR)

(72) Inventors: Hyeg Soon An, Suwon-si (KR); Hui Sun Park, Suwon-si (KR); Jeong Wook Seo, Suwon-si (KR); Tae Hyung Kim, Suwon-si (KR); Hee Sun Chun, Suwon-si (KR); Hyo Ju Lee, Suwon-si (KR); Jin Woo Kim, Suwon-si (KR); Seok Hyun Yoon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 343 days.

(21) Appl. No.: 17/899,983

(22) Filed: Aug. 31, 2022

(65) Prior Publication Data
US 2023/0335338 A1 Oct. 19, 2023

(30) Foreign Application Priority Data
Apr. 15, 2022 (KR) .......................... 10-2022-0046939

(51) Int. Cl.
*H01G 4/30* (2006.01)
*H01G 4/12* (2006.01)

(52) U.S. Cl.
CPC .............. *H01G 4/1227* (2013.01); *H01G 4/30* (2013.01)

(58) Field of Classification Search
None
See application file for complete search history.

(56) References Cited

U.S. PATENT DOCUMENTS

| 10,515,760 | B1* | 12/2019 | Park | C01G 23/006 |
| 11,101,073 | B2* | 8/2021 | Ham | H01G 4/30 |
| 2015/0036264 | A1* | 2/2015 | Morita | C04B 35/4682 |
| | | | | 361/321.4 |
| 2016/0307701 | A1* | 10/2016 | Park | H01G 4/1245 |

(Continued)

FOREIGN PATENT DOCUMENTS

| JP | 2021-002646 A | 1/2021 | |
| KR | 10-2021-0018058 A | 2/2021 | |
| WO | WO-2009119444 A1 * | 10/2009 | .......... C04B 35/4682 |

OTHER PUBLICATIONS

Translation of WO2009/119444 (Year: 2009).*

*Primary Examiner* — Dion R. Ferguson
(74) *Attorney, Agent, or Firm* — MORGAN, LEWIS & BOCKIUS LLP

(57) ABSTRACT

A multilayer electronic component includes a body including a dielectric layer and an internal electrode alternately disposed with the dielectric layer, and an external electrode disposed on the body. The dielectric layer includes a $BaTiO_3$-based base material main ingredient, a sub-ingredient including Dy, and an additive. The additive is one or more of Sm, Gd and Tb, and a content of the additive is 25 mol or more and less than 50 mol relative to 100 mol of Dy. The dielectric layer includes a plurality of dielectric grains. When an average grain size of the plurality of dielectric grains is represented by G, and an average thickness of the dielectric layer is represented by td, $1.75 \leq td/G \leq 2.23$ is satisfied.

23 Claims, 16 Drawing Sheets

(56) References Cited

U.S. PATENT DOCUMENTS

| | | |
|---|---|---|
| 2020/0402719 A1 | 12/2020 | Sugawara |
| 2021/0043380 A1 | 2/2021 | Ishibe et al. |
| 2022/0139623 A1* | 5/2022 | Park .................. H01G 4/232 |
| | | 361/301.4 |
| 2023/0119343 A1* | 4/2023 | Park .................. H01G 4/1227 |
| | | 361/301.4 |
| 2023/0335338 A1* | 10/2023 | An ..................... H01G 4/30 |

* cited by examiner

MULTILAYER ELECTRONIC COMPONENT AND METHOD FOR MANUFACTURING MULTILAYER ELECTRONIC COMPONENT

CROSS-REFERENCE TO RELATED APPLICATION(S)

This application claims benefit of priority to Korean Patent Application No. 10-2022-0046939 filed on Apr. 15, 2022 in the Korean Intellectual Property Office, the disclosure of which is incorporated herein by reference in its entirety.

TECHNICAL FIELD

The present disclosure relates to a multilayer electronic component, and a method for manufacturing the multilayer electronic component.

A multilayer ceramic capacitor (MLCC), a type of multilayer electronic component, may be a chip-type capacitor mounted on the printed circuit boards of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to having small sizes, high capacitance, and ease of mounting. As various electronic devices such as computers, mobile devices, or the like are miniaturized and increased in terms of output, demand for miniaturization and implementation of high capacitance of multilayer ceramic capacitors is increasing.

In addition, as interest in vehicle electric/electronic components has recently increased, multilayer ceramic capacitors also have been required to have high-reliability characteristics so as to be used in vehicle or infotainment systems.

Multilayer electronic components such as the multilayer ceramic capacitors mainly include a dielectric layer, an internal electrode, and an external electrode. The dielectric layer mainly includes a barium titanate ($BaTiO_3$)-based base material main ingredient, and a small amount of a sub-ingredient and an additive so as to improve electrical characteristics. Such a sub-ingredient and additive interact with the base material to form a specific microstructure and a defect chemical structure in the dielectric layer, thereby playing a critical role in implementing electrical characteristics that the multilayer electronic components require, such as a high dielectric constant and a low dielectric resistance degradation rate.

Therefore, in order to determine a defect chemical structure and a microstructure of a dielectric for implementing excellent electrical characteristics and securing reliability, meticulous control of a sub-ingredient and an additive is required.

SUMMARY

An aspect of the present disclosure is to effectively improve electrical characteristics of a dielectric layer by suppressing grain growth of a dielectric included in the dielectric layer.

Another aspect of the present disclosure is to remedy an issue in which structural stability of a dielectric layer is reduced due to grain size distribution and thickness deviation of the dielectric layer when the dielectric layer includes various additives to suppress grain growth.

Another aspect of the present disclosure is to resolve an issue in which a structurally weak dielectric layer is formed in a process of reoxidizing a sintered body.

However, the aspects of the present disclosure are not limited to the above, and will be more easily understood in the process of describing specific example embodiments of the present disclosure.

According to an aspect of the present disclosure, a multilayer electronic component includes a body including a dielectric layer and an internal electrode alternately disposed with the dielectric layer, and an external electrode disposed on the body. The dielectric layer includes a $BaTiO_3$-based base material main ingredient, a sub-ingredient including Dy, and an additive. The additive includes one or more of Sm, Gd, and Tb, and a content of the additive is 25 mol or more and less than 50 mol relative to 100 mol of Dy. The dielectric layer includes a plurality of dielectric grains. An average grain size of the plurality of dielectric grains is represented by G, an average thickness of the dielectric layer is represented by td, and $1.75 \leq td/G \leq 2.23$ may be satisfied.

According to another aspect of the present disclosure, a method for manufacturing a multilayer electronic component includes printing a conductive paste including a conductive metal on a dielectric green sheet including a dielectric composition, forming a laminate by laminating the dielectric green sheet on which the conductive paste is printed, sintering the laminate at a sintering temperature of 1100° C. to 1400° C. in a reducing atmosphere, forming a body including a dielectric layer and an internal electrode alternately disposed with the dielectric layer by reoxidizing the sintered laminate in an oxidizing atmosphere at a temperature lower than the sintering temperature, and forming an external electrode disposed on the body. The dielectric composition includes a $BaTiO_3$-based base material main ingredient, a sub-ingredient including Dy, and an additive including one or more of Sm, Gd, and Tb. A content of the additive is 25 mol or more and less than 50 mol relative to 100 mol of Dy.

According to another aspect of the present disclosure, a multilayer electronic component includes a body including a dielectric layer and an internal electrode alternately disposed with the dielectric layer, and an external electrode disposed on the body. The dielectric layer Dy, and an additive. The additive includes one or more of Sm, Gd, and Tb, and a content of the additive is more than 0 mol and less than 50 mol relative to 100 mol of Dy.

As one of various effects of the present disclosure, a dielectric layer having a dense and uniform grain size may be formed by adjusting a content of an amphoteric substitution element included in one dielectric layer, thereby reducing a dielectric resistance (IR) standard deviation.

As one of various effects of the present disclosure, structural stability may be secured by adjusting a content of an amphoteric substitution element included in a dielectric layer and adjusting the number of grains for one dielectric layer.

As one of various effects of the present disclosure, a content of an amphoteric substitution element included in a dielectric layer may be adjusted, thereby resolving an issue in which a structurally weak dielectric layer is formed in a reoxidizing process.

The various and beneficial advantages and effects of the present disclosure are not limited to the above, and will be more easily understood in the course of describing specific example embodiments.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
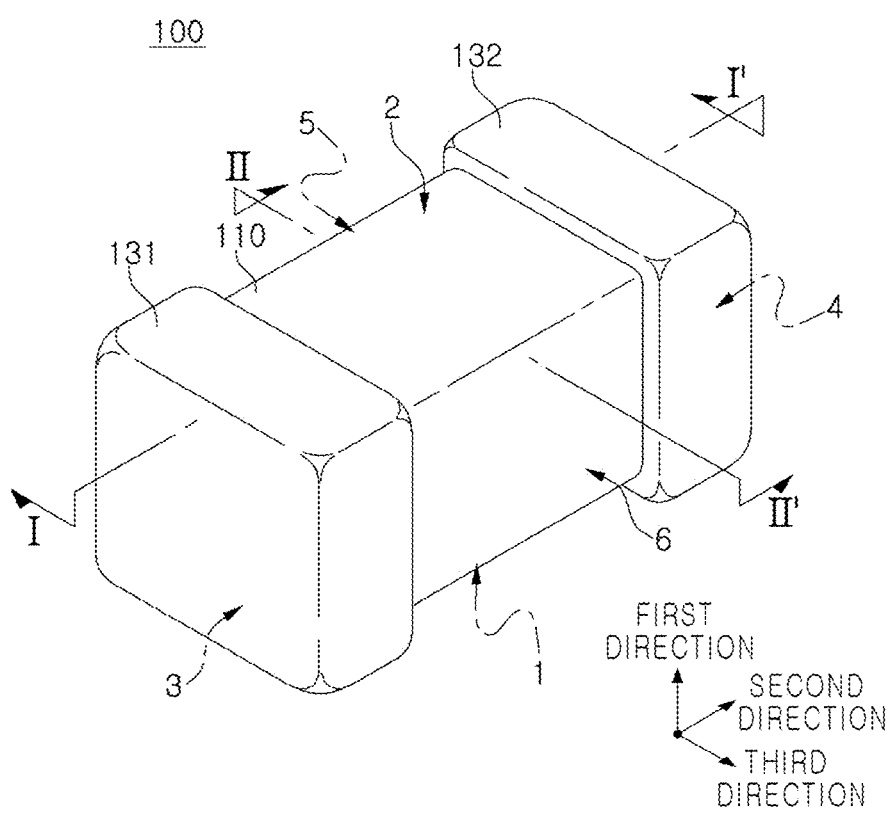
FIG. 1 is a perspective view schematically illustrating a multilayer electronic component according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is represented by as "comprising" or "including," it means that it may include other elements as well, rather than excluding other elements, unless specifically stated otherwise.

In the drawings, a first direction may be defined as a length (L) direction, a second direction may be defined as a thickness (T) direction, and a third direction may be defined as a width (W) direction.

Dielectric Composition

A dielectric composition according to an example embodiment of the present disclosure may include a $BaTiO_3$-based base material main ingredient, a sub-ingredient including Dy, and an additive, the additive may be one or more of Sm, Gd, and Tb, and a content of the additive may be mol or more or less than 50 mol relative to 100 mol of Dy. In some embodiments, the additive may include one or more of Sm, Gd, and Tb. In some embodiments, a content of the additive may be more than 0 mol or less than 50 mol relative to 100 mol of Dy.

With the trend for high-capacitance and ultra-thin multilayer ceramic capacitors, it may be necessary to design a composition for a multilayer ceramic capacitor having a high dielectric constant, the composition for a multilayer ceramic capacitor including a capacitance formation portion with uniform electrical characteristics.

Such characteristics may be achieved when a defect chemical structure of a dielectric layer does not change depending on a position thereof due to a uniformly contained additive while no structural weak portion exists due to low particle size distribution and a low thickness deviation of the dielectric layer.

In general, a dielectric layer grain may have significantly higher grain boundary electrical resistance compared to in-grain electrical resistance, and thus a microstructure of a dielectric layer having a small and uniform grain size may considered ideal. Accordingly, in the present disclosure, a type and a content of an additive included in the dielectric layer may be adjusted, thereby suppressing grain growth of a base material due to relatively slow substitution reaction of the additive in an initial stage of sintering while forming a defect chemical structure due to substitution for a $BaTiO_3$-based base material main ingredient being performed in a final stage of sintering.

The $BaTiO_3$-based base material main ingredient may have a perovskite-based crystal structure, and stability of the perovskite structure may be represented by the Goldschmidt structural factor (t). It can be seen that a t value of the perovskite structure of pure $BaTiO_3$ is 1.06, and structural stability is lowered as a size of an element substituted for a Ti site is increased, and as a result, the t value is reduced. In particular, it is known that elements that are substituted for the Ti site so that a value of the Goldschmidt structural factor (t) satisfies $0.9<t<0.92$ have an amphoteric substitution characteristic of making substitution for the Ti site difficult while making substitution for a Ba site possible. When the elements are used as additives, a denser dielectric microstructure with high dielectric resistance may be obtained by suppressing grain growth of a base material during sintering, and at the same time, a defect chemical role of the additive may be expected after sintering.

The dielectric composition according to an example embodiment of the present disclosure may include, as an additive, one or more of samarium (Sm), gadolinium (Gd), and terbium (Tb) satisfying a $0.9<t<0.92$ region when substitution for the Ti site of the $BaTiO_3$-based base material main ingredient is performed, and thus grain growth of the dielectric composition may be suppressed, thereby reducing a dielectric resistance standard deviation of the dielectric layer.

Hereinafter, respective ingredients of the dielectric composition according to an example embodiment of the present disclosure are described in detail.

a) Main Ingredient

The dielectric composition according to an example embodiment of the present disclosure may include a $BaTiO_3$-based base material main ingredient. Specifically, the BaTiO$_3$-based base material main ingredient may include one or more of BaTiO$_3$, (Ba,Ca)(Ti,Ca)O$_3$, (Ba,Ca)(Ti,Zr)O$_3$, Ba(Ti,Zr)O$_3$, and (Ba,Ca)(Ti,Sn)O$_3$.

For more specific example, the BaTiO$_3$-based base material main ingredient may be one or more selected from the group consisting of BaTiO$_3$, (Ba$_{1-x}$Ca$_x$)(Ti$_{1-y}$Ca$_y$)O$_3$ (where x is 0≤x≤0.3, and y is 0≤y≤0.1), (Ba$_{1-x}$Ca$_x$)(Ti$_{1-y}$Zr$_y$)O$_3$ (where x is 0≤≤0.3, and y is 0≤y≤0.5), Ba(Ti$_{1-y}$Zr$_y$)O$_3$ (where 0<y≤0.5), and (Ba$_{1-x}$Ca$_x$)(Ti$_{1-y}$Sn$_y$)O$_3$ (where, x is 0≤x≤0.3, and y is 0≤y≤0.1).

b) Sub-Ingredient

According to an example embodiment of the present disclosure, the dielectric composition may include a sub-ingredient including Dy.

The sub-ingredient may include dysprosium (Dy) as a rare earth element, but is not limited thereto. The rare earth element may serve as a donor by substituting an A-site of an ABO$_3$ structure, and thus oxygen vacancy concentration may be reduced, thereby improving reliability. In addition, the rare earth element may act as a barrier that blocks a flow of electrons at a grain boundary, thereby serving to suppress an increase in leakage current.

The sub-ingredient may include one or more of a variable-valence acceptor element and a fixed-valence acceptor element. The variable-valence acceptor element and the fixed-valence acceptor element may be mainly substituted for a B-site of the ABO$_3$ structure to serve as an acceptor, and serve to reduce electron concentration. Accordingly, the variable-valence acceptor element and the fixed-valence acceptor element may serve to suppress semiconductorization of the dielectric layer caused by A-site solid solution of the rare earth element. In addition, the variable-valence acceptor element and the fixed-valence acceptor element may serve to lower sintering temperature and improve high-temperature withstand voltage characteristics of a multilayer ceramic capacitor to which the dielectric composition is applied. In this case, the variable-valence acceptor may include one or more of Mn, V, Cr, Fe, Ni, Co, Cu, and Zn, and the fixed-valence acceptor may include one or more of Mg and Zr.

The sub-ingredient may include an oxide or carbonate including Ba. The oxide or carbonate including Ba may serve to promote sintering and adjust a dielectric constant in the dielectric composition.

The sub-ingredient may include at least one of an oxide including at least one of Si and Al and a glass compound including Si. The oxide including at least one of Si and Al and the glass compound including Si may serve to lower the sintering temperature and improve high-temperature withstand voltage characteristics of the multilayer electronic component to which the dielectric composition is applied.

c) Additive

According to an example embodiment of the present disclosure, the dielectric composition may include an additive, the additive may be at least one of Sm, Gd, and Tb, and a content of the additive may be 25 mol or more and less than 50 mol relative to 100 mol of Dy. In some embodiments, the additive may include one or more of Sm, Gd, and Tb. In some embodiments, the additive may be Tb. In some embodiments, the additive may be Gd. In some embodiments, the additive may be Sm. In some embodiments, a content of the additive may be more than 0 mol or less than 50 mol relative to 100 mol of Dy.

When the additive is included in the dielectric composition, it may be difficult to substitute an element of the additive for a Ti site of a BaTiO$_3$-based base material, and it may be possible to substitute the element of the additive for a Ba site of the BaTiO$_3$-based base material. Accordingly, the additive may suppress grain growth of the dielectric composition while forming a defect chemical structure, thereby reducing a dielectric resistance standard deviation.

When the content of the additive is 0 mol or less than 25 mol relative to 100 mol of Dy, the grain growth of the dielectric composition may not be sufficiently suppressed, and thus it may be difficult to reduce a dielectric resistance standard deviation of a dielectric layer after sintering.

When the content of the additive is 50 mol or more relative to 100 mol of Dy, concentration of electrons in the dielectric layer may be increased after sintering, as described below. Accordingly, it may be difficult to reduce the dielectric resistance standard deviation.

Therefore, according to an example embodiment of the present disclosure, the content of the additive may be adjusted to be 25 mol or more and less than 50 mol relative to 100 mol of Dy, and thus the grain growth of the dielectric composition may be sufficiently suppressed, and an increase in oxygen vacancy concentration and electron concentration in the dielectric layer may be suppressed, thereby reducing the dielectric resistance standard deviation.

In some embodiments, the content of the additive is based on the amount of additive and Dy added during the manufacturing of a dielectric green sheet. In some embodiments, the content of the additive may be measured using SEM-EDS. For example, a cross-section of the body 110 may be imaged and the content of the additive and Dy may be measured at thirty points equally spaced apart in the third direction. Other methods and/or tools appreciated by one of ordinary skill in the art, even if not described in the present disclosure, may also be used.

Figure 8:
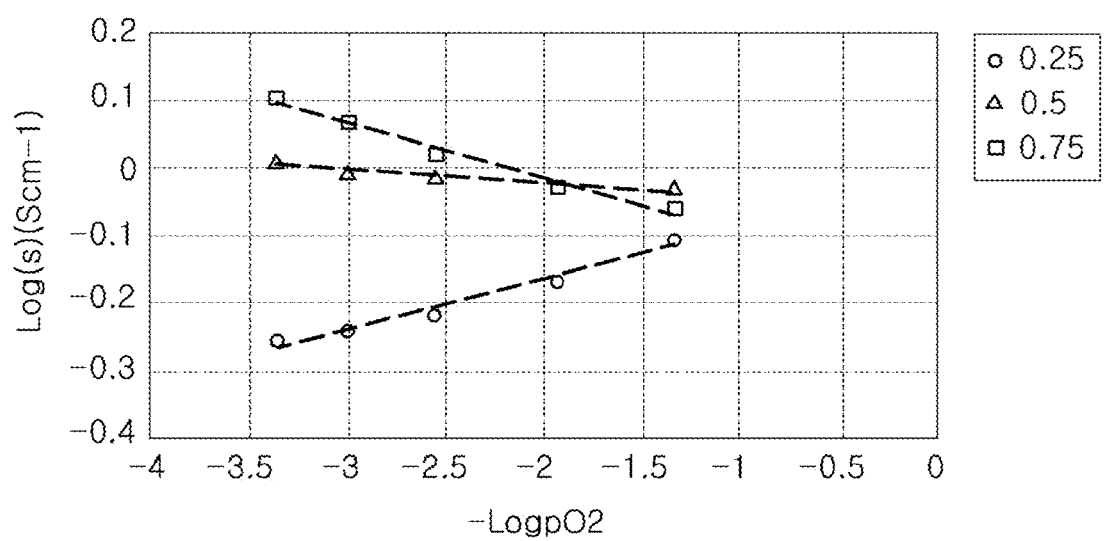
FIG. 8 is a graph illustrating results of measuring electrical conductivity according to oxygen partial pressure for different contents of an added element.

FIG. 8 is a graph illustrating results of measuring electrical conductivity according to oxygen partial pressure for different contents of an added element;

Specifically, FIG. 8 illustrates electrical conductivity according to oxygen partial pressure measured when 25 mol of a Gd element is added relative to 100 mol of Dy (o 0.25), when 50 mol of the Gd element is added relative to 100 mol of Dy (Δ 0.5), and when 75 mol of the Gd element is added relative to 100 mol of Dy (☐0.75). Referring to FIG. 8, it can be seen that a slope of electrical conductivity according to oxygen partial pressure changes from positive (+) to negative (−) when the content of Gd relative to Dy is increased. In particular, when the Gd element is 50 mol or more relative to 100 mol of a Dy element, it can be seen that the slope of the electrical conductivity according to the oxygen partial pressure has a negative (−) value.

Figure 9:
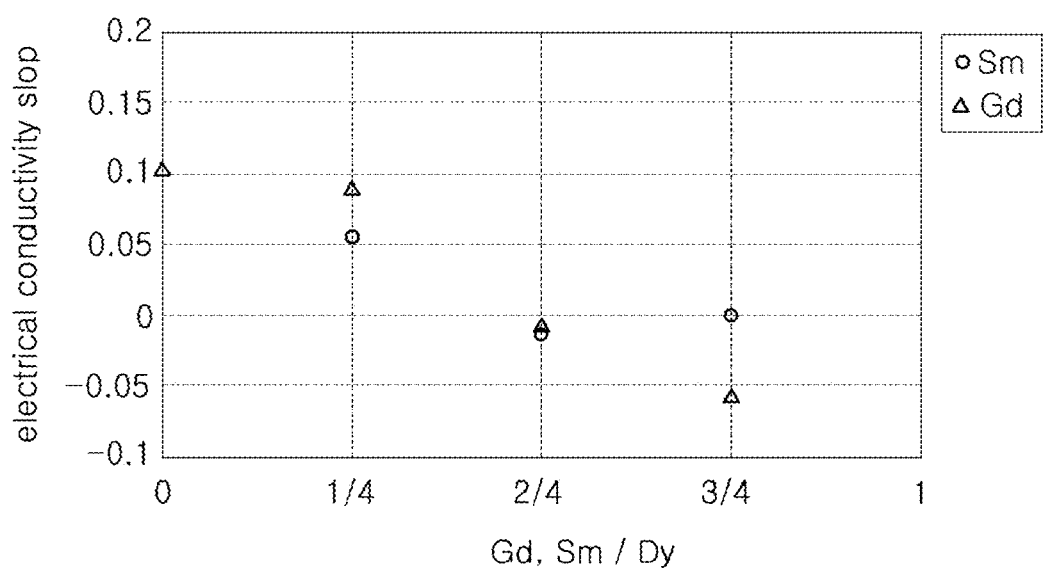
FIG. 9 is a graph illustrating results of measuring a slope of electrical conductivity according to oxygen partial pressure for different types of added elements.

FIG. 9 is a graph illustrating results of measuring a slope of electrical conductivity according to oxygen concentration for different types of added elements.

Referring to FIGS. 8 and 9, as an added amount of Gd and Sm elements relative to the Dy element increases, an additive may be substituted for a Ba site after sintering to increase effective electron donor concentration in a dielectric, and the effective electron donor concentration may gradually exceed effective electron acceptor concentration due to a sub-ingredient, so that it is illustrated that a change in electrical conductivity according to oxygen concentration of the dielectric changes from electron acceptor dominant to electron donor dominant. Specifically, when the content of the additive is more than 0 mol or 25 mol relative to 100 mol of Dy, the effective electron acceptor concentration in the dielectric may be dominant. Accordingly, there may be a positive correlation that electrical conductivity increases with increasing oxygen concentration. Conversely, when the content of the additive is 75 mol or more relative to 100 mol of Dy, the donor concentration may be dominant. Accordingly, there may be a negative correlation that electrical conductivity decreases with increasing oxygen concentration. When 50 mol of the additive is contained relative to 100 mol of Dy, the effective electron acceptor and electron donor may have similar concentrations, and thus the Fermi level pinning phenomenon may be observed in which electrical conductivity according to a change in oxygen partial pressure is invariant.

When a voltage is continuously applied to a multilayer electronic component, electric charge carriers such as an oxygen vacancy and an electron contained in a dielectric may move to both ends of a dielectric adjacent to an internal electrode, causing a local change in electrical characteristics. Such a change in the electrical characteristics of the dielectric may be in the same thermodynamic state as that of the resistance change of the dielectric according to the oxygen concentration of FIGS. 8 and 9. When a content of a corresponding additive is insufficient or excessive, the dielectric may show a sudden change in electrical properties according to application of an external voltage. In this case, it may be difficult to expect improvement in electrical resistance due to densification of a dielectric microstructure. The graph of FIG. 8 illustrates a result obtained by adjusting a content of a Dy element, and the graph of FIG. 9 illustrates a result obtained by adjusting a content of Sm or Gd, but it may be understood in the same manner when the additive is one or more of Tb, Sm, and Gd.

Accordingly, in an example embodiment of the present disclosure, contents of one or more additives among Sm, Gd, and Tb may be adjusted to be less than 50 mol relative to 100 mol of Dy, thereby suppressing a deviation in the electrical characteristics of the dielectric while alleviating a decrease in the dielectric resistance of the dielectric caused by the application of an external electric field.

A lower limit of the additive content is not particularly limited, and may be adjusted depending on a dielectric grain size. In some embodiments, the lower limit may be more than 0 mol. However, in order to sufficiently suppress the grain growth of the dielectric, the additive may be preferably included in an amount of 25 mol or more relative to 100 mol of Dy.

Multilayer Electronic Component

FIG. 1 is a perspective view schematically illustrating a multilayer electronic component according to an example embodiment of the present disclosure.

Figure 2:
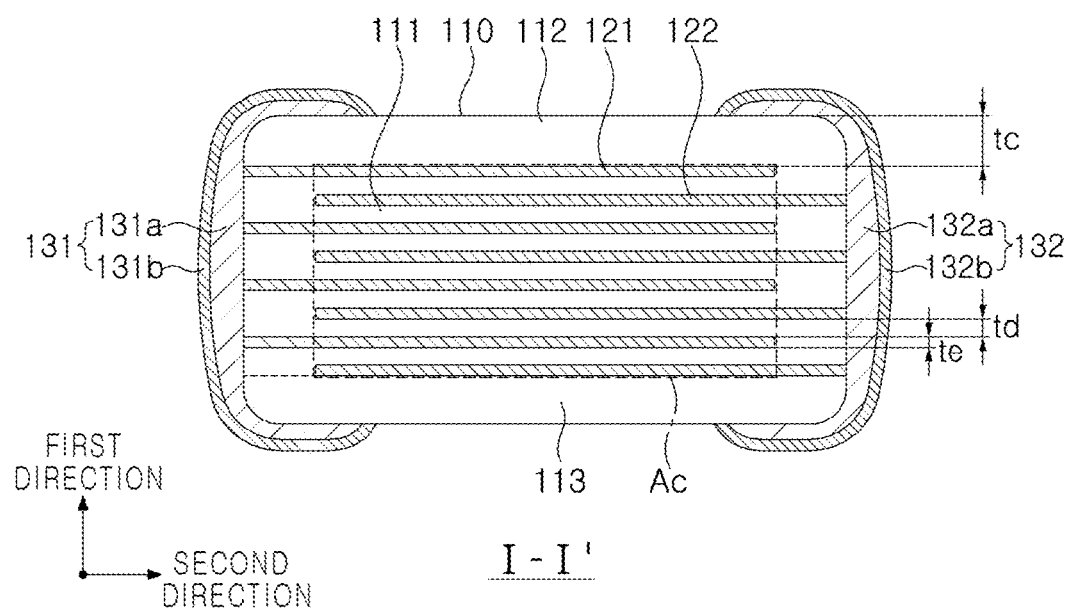
FIG. 2 is a cross-sectional view taken along line I-I' of FIG. 1.

FIG. 2 is a cross-sectional view taken along line II' of FIG. 1.

Figure 3:
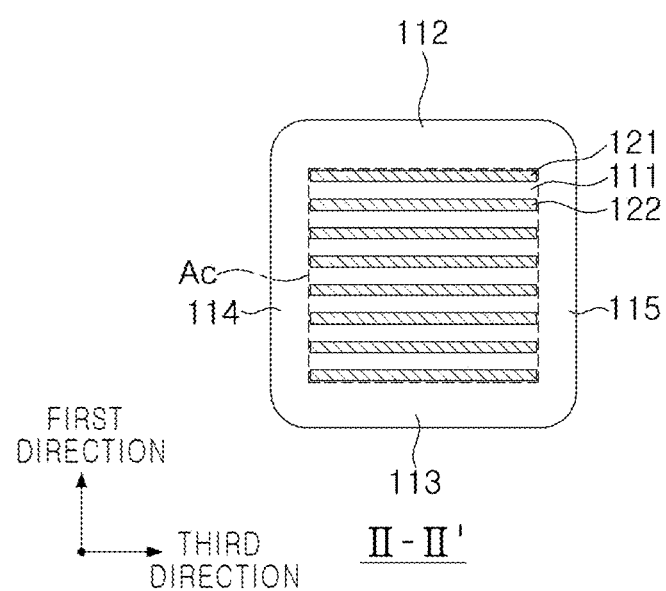
FIG. 3 is a cross-sectional view taken along line II-II' of FIG. 1.

FIG. 3 is a cross-sectional view taken along line II-II' of FIG. 1.

Figure 4:
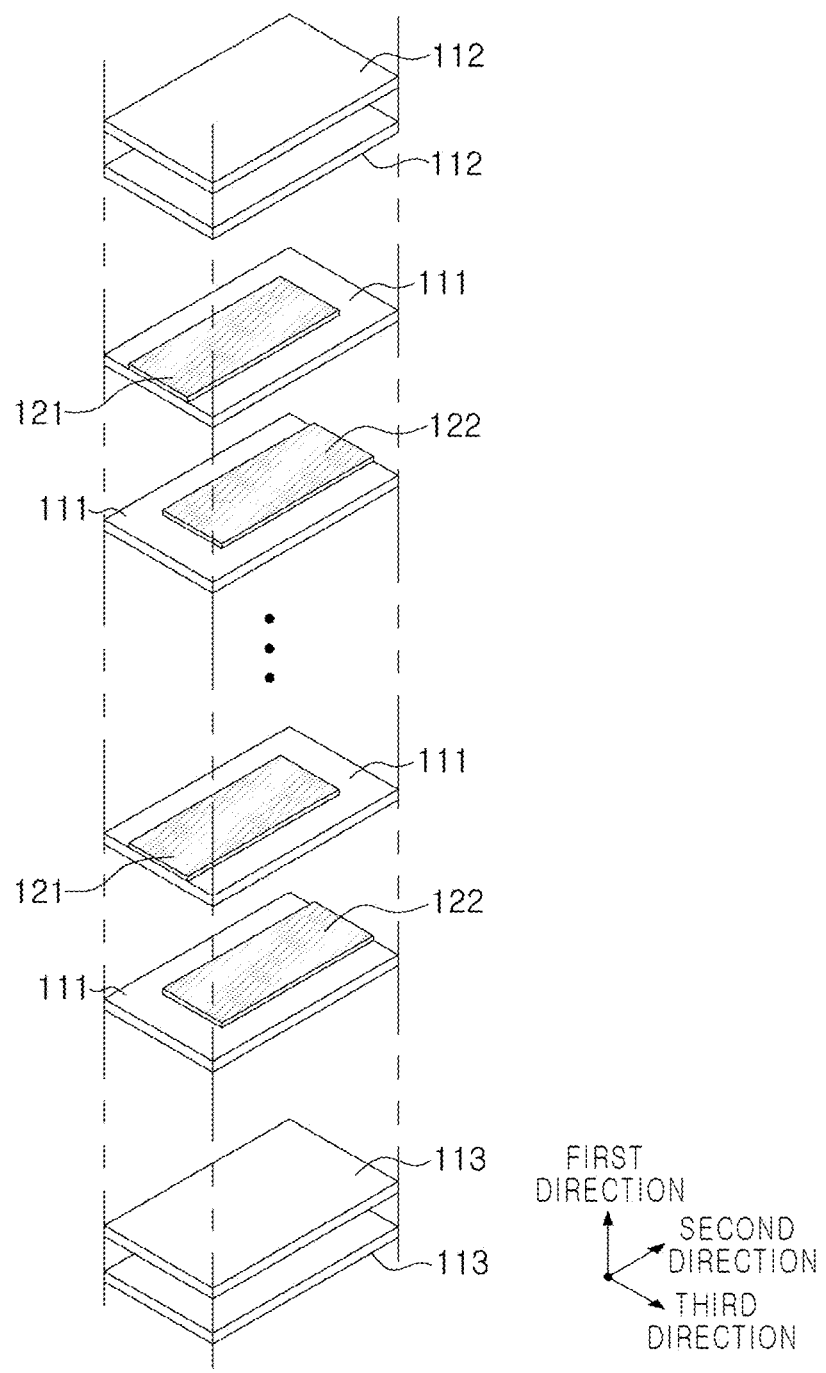
FIG. 4 is an exploded perspective view illustrating the body of FIG. 1.

FIG. 4 is an exploded perspective view illustrating the body of FIG. 1.

Referring to FIGS. 1 to 4, a multilayer electronic component 100 according to an example embodiment of the present disclosure may include a body 110 including a dielectric layer 111 and internal electrodes 121 and 122 alternately disposed with the dielectric layer 111, and external electrodes 131 and 132 disposed on the body 110. The dielectric layer may include a dielectric composition. The dielectric composition may include a $BaTiO_3$-based base material main ingredient, a sub-ingredient including Dy, and an additive. The additive may be one or more of Sm, Gd, and Tb. In some embodiments, the additive may include one or more of Sm, Gd, and Tb. A content of the additive may be 25 mol or more and less than 50 mol relative to 100 mol of Dy. In some embodiments, a content of the additive may be more than 0 mol or less than 50 mol relative to 100 mol of Dy.

Hereinafter, contents overlapping with those described in connection with the above-described dielectric composition are omitted to avoid repeated descriptions. In addition, although a multilayer ceramic capacitor is described as an example of a multilayer electronic component, the present disclosure may also be applied to various electronic products using the above-described dielectric composition, for example, an inductor, a piezoelectric device, a varistor, a thermistor, or the like.

In the body 110, a dielectric layer 111 and internal electrodes 121 and 122 may be alternately laminated.

A specific shape of the body 110 is not particularly limited, but as illustrated, the body 110 may have a hexahedral shape or a shape similar thereto. Due to shrinkage of a ceramic powder included in the body 110 during a sintering process, the body 110 may not have a perfectly straight hexahedral shape, but may have a substantially hexahedral shape.

The body 110 may have first and second surfaces 1 and 2 opposing each other in a first direction (Z-direction), third and fourth surfaces 3 and 4 connected to the first and second surfaces 1 and 2 and opposing each other in a second direction (X-direction), and fifth and sixth surfaces 5 and 6 connected to the third and fourth surfaces 3 and 4 and opposing each other in a third direction (Y-direction).

A plurality of dielectric layers 111 forming the body 110 may be in a sintered state, and a boundary between adjacent dielectric layers 111 may be integrated to the extent that it is difficult to identify the boundary without using a scanning electron microscope (SEM).

The dielectric layer 111 may be formed using the above-described dielectric composition.

The body 110 may be disposed in the body 110, and may include a capacitance formation portion Ac including a first internal electrode 121 and a second internal electrode 122 opposing each other with the dielectric layer 111 interposed therebetween, the capacitance formation portion Ac forming capacitance, and cover portions 112 and 113 respectively formed on upper and lower portions of the capacitance formation portion Ac.

In addition, the capacitance formation portion Ac, a portion contributing to capacitance formation of a capacitor, may be formed by repeatedly laminating the plurality of first and second internal electrodes 121 and 122 with the dielectric layer 111 interposed therebetween.

The upper cover portion 112 and the lower cover portion 113 may be formed by laminating a single dielectric layer or two or more dielectric layers on upper and lower surfaces of the capacitance formation portion Ac in a thickness direction, respectively, and may basically serve to prevent damage to an internal electrode caused by physical or chemical stress The upper cover portion 112 and the lower cover portion 113 may not include an internal electrode, and may include the same material as that of the dielectric layer 111.

That is, the upper cover portion 112 and the lower cover portion 113 may include a ceramic material, for example, a barium titanate ($BaTiO_3$)-based ceramic material.

An average thickness of the cover portions 112 and 113 is not particularly limited. However, in order to more easily achieve miniaturization and implementation of high capacitance of the multilayer electronic component, an average thickness tc of the cover portions 112 and 113 may be 15 μm or less. In addition, according to an example embodiment of the present disclosure, reliability may be improved by adjusting contents of one or more additives among Sm, Gd, and Tb to be 25 mol or more and less than 50 mol relative to 100 mol of Dy. Thus, even when the average thickness tc of the cover portions 112 and 113 is 15 µm or less, excellent reliability may be secured.

The average thickness tc of the cover portions 112 and 113 may refer to a size in a first direction, and may be a value obtained by calculating an average of sizes in the first direction of the cover portions 112 and 113 measured at five equally spaced apart points on the upper or lower portions of the capacitance formation portion Ac.

In addition, margin portions 114 and 115 may be disposed on side surfaces of the capacitance formation portion Ac, respectively.

The margin portions 114 and 115 may include a margin portion 114 disposed on a sixth surface 6 of the body 110 and a margin portion 115 disposed on a fifth surface 5 of the body 110. That is, the margin portions 114 and 115 may be disposed on both side surfaces of the ceramic body 110 in a width direction.

As illustrated in FIG. 3, the margin portions 114 and 115 may refer to a region between both ends of the first and second internal electrodes 121 and 122 and a boundary surface of the body 110 in a cross-section of the body 110 cut in a width-thickness (W-T) direction.

The margin portions 114 and 115 may basically serve to prevent damage to an internal electrode caused by physical or chemical stress.

The margin portions 114 and 115 may be formed by forming an internal electrode by applying a conductive paste on a ceramic green sheet except a portion in which a margin portion is to be formed.

In addition, in order to suppress a step difference caused by the internal electrodes 121 and 122, after lamination, the internal electrodes may be cut to be exposed to the fifth and sixth surfaces 5 and 6 of the body, and then a single dielectric layer or two or more dielectric layers may be laminated on the both side surfaces of the capacitance formation portion Ac in the width direction, thereby forming the margin portions 114 and 115.

The internal electrodes 121 and 122 may be alternately laminated with the dielectric layer 111.

The internal electrodes 121 and 122 may include first and second internal electrodes 121 and 122. The first and second internal electrodes 121 and 122 may be alternately opposing each other with the dielectric layer 111 included in the body 110 interposed therebetween, and may be exposed to the third and fourth surfaces 3 and 4 of the body 110, respectively.

Referring to FIG. 2, the first internal electrode 121 may be spaced apart from the fourth surface 4, and may be exposed through the third surface 3, and the second internal electrode 122 may be spaced apart from the third surface 3, and may be exposed through the fourth surface 4.

In this case, the first and second internal electrodes 121 and 122 may be electrically isolated from each other by the dielectric layer 111 disposed in a middle portion thereof.

Referring to FIG. 3, the body 110 may be formed by alternately laminating a ceramic green sheet on which the first internal electrode 121 is printed and a ceramic green sheet on which the second internal electrode 122 is printed, and then performing sintering thereon. A material for forming the internal electrodes 121 and 122 is not particularly limited, and a material having excellent electrical conductivity may be used.

For example, a conductive paste for an internal electrode including one or more of palladium (Pd), nickel (Ni), copper (Cu), and alloys thereof may be printed on a ceramic green sheet to form the body 110.

A printing method of the conductive paste for an internal electrode may use a screen printing method or a gravure printing method, but the present disclosure is not limited thereto.

An average thickness te of the internal electrodes 121 and 122 is not particularly limited.

The average thickness te of the internal electrodes 121 and 122 is not particularly limited. However, in general, when an internal electrode is thinly formed to have a thickness of less than 0.6 µm, in particular, when the internal electrode has a thickness of 0.35 µm or less, there may be concern for reduced reliability.

According to an example embodiment of the present disclosure, reliability may be improved by adjusting contents of one or more additives among Sm, Gd and Tb to be mol or more and less than 50 mol relative to 100 mol of Dy. Thus, even when the average thickness te of the internal electrodes 121 and 122 is 0.35 µm or less, excellent reliability may be secured.

Accordingly, when the internal electrodes 121 and 122 have an average thickness of 0.35 µm or less, the effect according to the present disclosure may be more significant, and miniaturization and implementation of high capacitance of the multilayer electronic component may be more easily achieved.

The thickness te of the internal electrodes 121 and 122 may refer to an average thickness of the first and second internal electrodes 121 and 122.

The thickness te of the internal electrodes 121 and 122 may be measured by scanning, with an SEM, an image of a cross-section in third and first directions (L-T cross-section) of the body 110.

For example, with respect to arbitrary internal electrodes 121 and 122 extracted from an image obtained by scanning, with the SEM, a cross-section in third and first directions (W-T cross-section) cut from a central portion in a second direction (L-direction) of the body 110, a thickness thereof may be measured at thirty points equally spaced apart in the third direction to measure an average value.

The thirty equally spaced apart points may be measured in the capacitance formation portion Ac, which refer to a region where the internal electrodes 121 and 122 overlap each other.

A thickness td of the dielectric layer 111 may refer to an average thickness of the dielectric layer 111 disposed between the first and second internal electrodes 121 and 122.

In a similar manner to the thickness to of the internal electrode, the average thickness td of the dielectric layer 111 may be also measured by scanning, with the SEM, the image of the cross-section in the third and first directions (L-T cross-section) of the body 110.

For example, with respect to an arbitrary dielectric layer 111 extracted from an image obtained by scanning, with the SEM, the cross-section in the third and first directions (W-T cross-section) cut from the central portion of the body 110 in the second direction (L-direction), a thickness thereof may be measured at thirty points equally spaced apart in the third direction to measure an average value.

The thirty equally spaced apart points may be measured in the capacitance formation portion Ac, which refer to a region where the internal electrodes 121 and 122 overlap each other.

The dielectric layer 111 may include a dielectric composition according to an example embodiment of the present disclosure. That is, the dielectric layer 111 of the multilayer electronic component 100 according to an example embodiment of the present disclosure may include a dielectric composition. The dielectric composition may include a $BaTiO_3$-based base material main ingredient, a sub-ingredient including Dy, and an additive. The additive may be one or more of Sm, Gd, and Tb, and a content of the additive may be mol or more and less than 50 mol relative to 100 mol of Dy. Accordingly, it is possible to suppress a deviation in electrical characteristics of the dielectric layer 111 while alleviating a decrease in dielectric resistance of the multilayer electronic component 100 caused by application of an external electric field.

Other main and sub-ingredients of the dielectric composition included in the dielectric layer 111 may be the same as those of the dielectric composition according to an example embodiment of the present disclosure, descriptions thereof will be omitted to avoid repeated descriptions.

In order to achieve miniaturization and implementation of high capacitance of a multilayer ceramic capacitor, it may be required to increase the number of laminates by reducing a thickness of each of a dielectric layer and an internal electrode. As the thickness of each of the dielectric layer and the internal electrode is reduced, reliability may be reduced, and characteristics such as insulation resistance and breakdown voltage may be reduced.

Accordingly, as the thickness of each of the dielectric layer and the internal electrode are reduced, the reliability improvement effect according to the present disclosure may be increased.

In particular, according to an example embodiment of the present disclosure, a correlation may be controlled between a content of the Dy element included in the dielectric composition and a content of an additive including one or more of Sm, Gd, and Tb, thereby improving insulation resistance, and reducing a standard deviation of the insulation resistance. Thus, when the thickness to of the internal electrodes 121 and 122 or the thickness td of the dielectric layer 111 is 0.41 μm or less, the effect of improving insulation resistance and dielectric constant per grain size according to the present disclosure may be significant.

Figure 6:
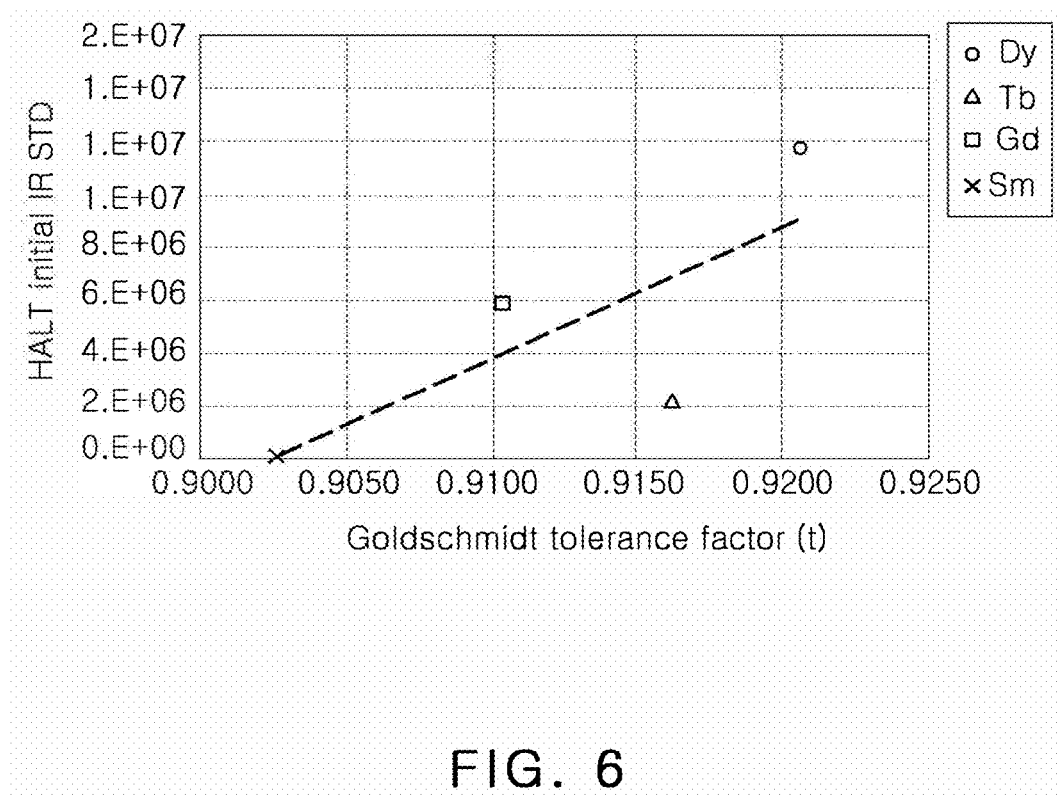
FIG. 6 is a graph illustrating a dielectric resistance standard deviation according to the Goldschmidt tolerance factor (t) for a perovskite structure.
Figure 7:
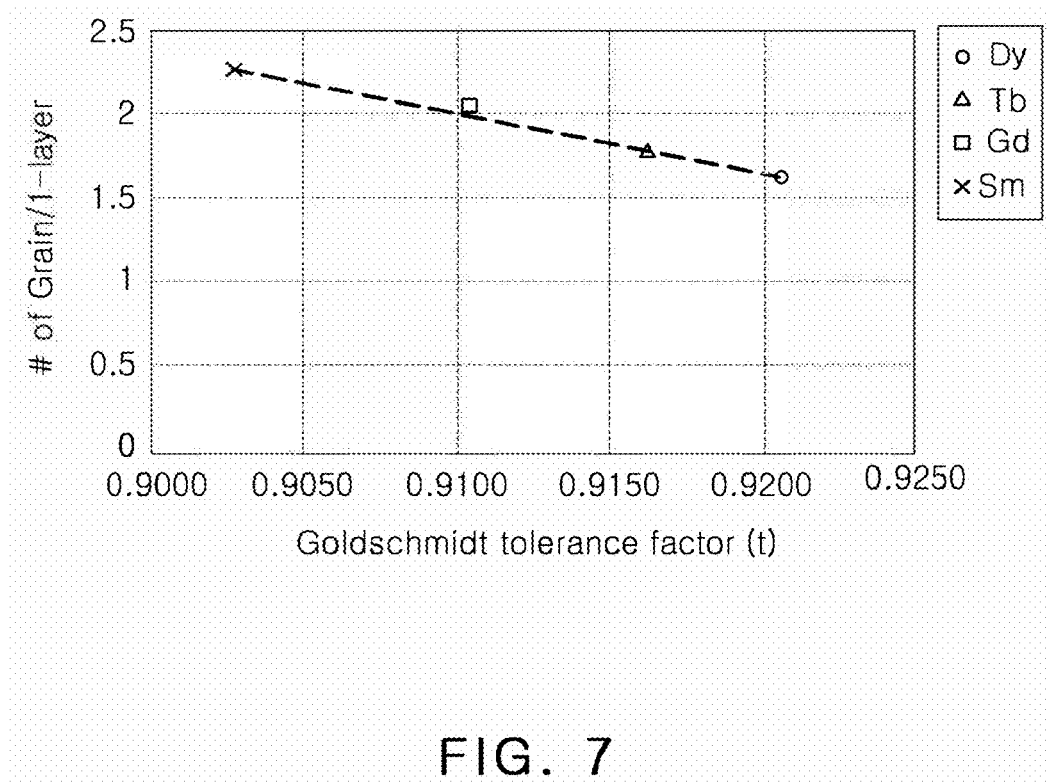
FIG. 7 is a graph illustrating the number of grains for one dielectric layer (td/G) according to the Goldschmidt tolerance factor (t) for a perovskite structure.

FIG. 6 is a graph illustrating a dielectric resistance standard deviation according to the Goldschmidt tolerance factor (t). FIG. 7 is a graph illustrating the number of grains for one dielectric layer (td/G) according to the Goldschmidt tolerance factor (t).

Referring to FIG. 7, the dielectric composition may form a dielectric layer including a plurality of dielectric grains after sintering. As a value of Goldschmidt structural factor (t) with a perovskite structure is reduced, substitution of a dielectric base material for a Ti site may be difficult, and thus a grain size number per dielectric layer may tend to increase.

Accordingly, when the dielectric composition includes one or more of Tb, Gd, and Sm, the value of the Goldschmidt structural factor (t) with the perovskite structure may be lowered compared to those of other elements having the same oxidation number, thereby forming a dielectric layer having a dense grain size.

Referring to FIG. 7, when the dielectric composition includes Sm as an additive (x), the number of grains for one dielectric layer (td/G) may be 2.23. When the dielectric composition includes Gd as an additive (□), the number of grains for one dielectric layer (td/G) may be 2.03. When the dielectric composition includes Tb as an additive (△), the number of grains for one dielectric layer (td/G) may be 1.75.

When no additive is included (o), the number of grains for one dielectric layer (td/G) may be 1.61. In this case, referring to FIG. 6, when the number of grains for one dielectric layer (td/G) is less than 1.75 (o), it can be seen that a dielectric resistance standard deviation of an initial HALT reliability evaluation is higher. Accordingly, according to an example embodiment, the dielectric layer may include a plurality of dielectric grains. When an average grain size of the plurality of dielectric grains is represented by G, and an average thickness of the dielectric layer is represented by td, it may be preferable to satisfy $1.75 \leq td/G$.

An upper limit of the td/G value is not particularly limited. However, when an additive that adjusts the value of the Goldschmidt structural factor (t) to be 0.9 or less is added so as to adjust td/G to exceed 2.23, it may be difficult to have an amphoteric substitution characteristic, and to improve a dielectric resistance value through suppression of grain growth of a base material. Accordingly, it may be preferable to satisfy $td/G \leq 2.23$. That is, G and td of the multilayer electronic component 100 according to an example embodiment of the present disclosure may satisfy $1.75 \leq td/G \leq 2.23$.

FIGS. 5A, 5B, 5C, and 5D are images of cross-sections of a dielectric layer for different types of added elements.

Referring to FIGS. 5A to 5D, it can be seen that grain sizes of the plurality of dielectric grains vary depending on a type of added element.

Figure 5A:
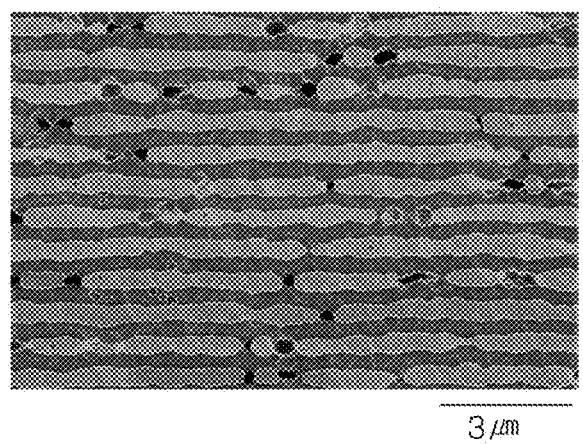
FIGS. 5A, 5B, 5C, and 5D are scanning electron microscope (SEM) images of cross-sections of a dielectric layer for different types of added elements.
Figure 5B:
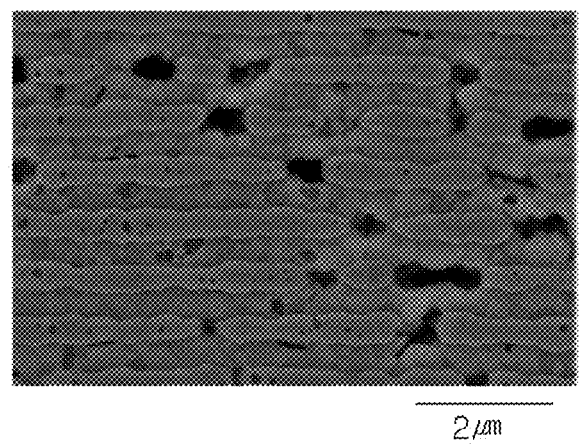
Figure 5C:
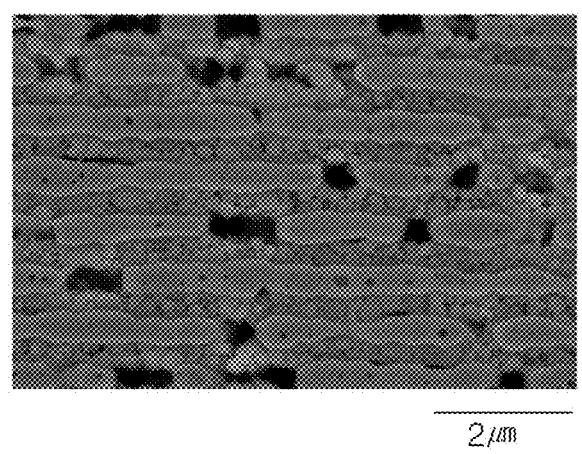
Figure 5D:
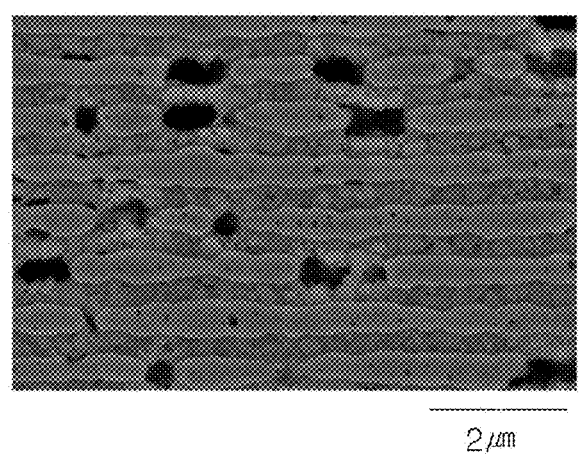

FIG. 5A may be a case in which no additive is included (average grain size of 217 nm), FIG. 5B may be a case in which Tb is included as an additive (average grain size of 200 nm), FIG. 5C may be a case in which Gd is included as an additive (average grain size of 172 nm), and FIG. 5D may be a case in which Sm is included as an additive (average grain size of 157 nm).

As the value of the Goldschmidt structural factor (t) of the perovskite structure is reduced, the average grain size of the plurality of dielectric grains may be reduced, thereby effectively reducing the dielectric resistance standard deviation.

In an example embodiment, the dielectric layer may include a plurality of dielectric grains, and an average grain size of the plurality of dielectric grains may be 200 nm or less. Accordingly, it is possible to effectively reduce the dielectric resistance standard deviation by atomizing the dielectric grains.

A lower limit of the average grain size of the plurality of dielectric grains is not particularly limited. However, an element having a smallest Goldschmidt structural factor (t) with the perovskite structure among additive elements having an amphoteric substitution characteristic may be samarium (Sm), and thus the average grain size of the plurality of dielectric grains may be preferably 157 nm or more.

The average grain size of the plurality of dielectric grains may be an arithmetic average of grain sizes measured at ten sites of a cross-section in a width-thickness direction (WT cross-section) of a capacitance formation portion. Positions of the ten sites may be an arithmetic average of values measured at ten equally spaced apart sites in a W-axis direction with respect to a cut surface passing through a central portion of a multilayer electronic component while being perpendicular to a T-axis of the multilayer electronic component. The grain size of the plurality of dielectric grains may refer to a length in the W-axis direction of a grain calculated using an image analysis program (Image-Pro Plus version 4.5 made by Media cybernetics Inc.) after capturing an image of a cross-section of the grain with the SEM (JSM-7400F made by JEOL, Ltd.).

Figure 10A:
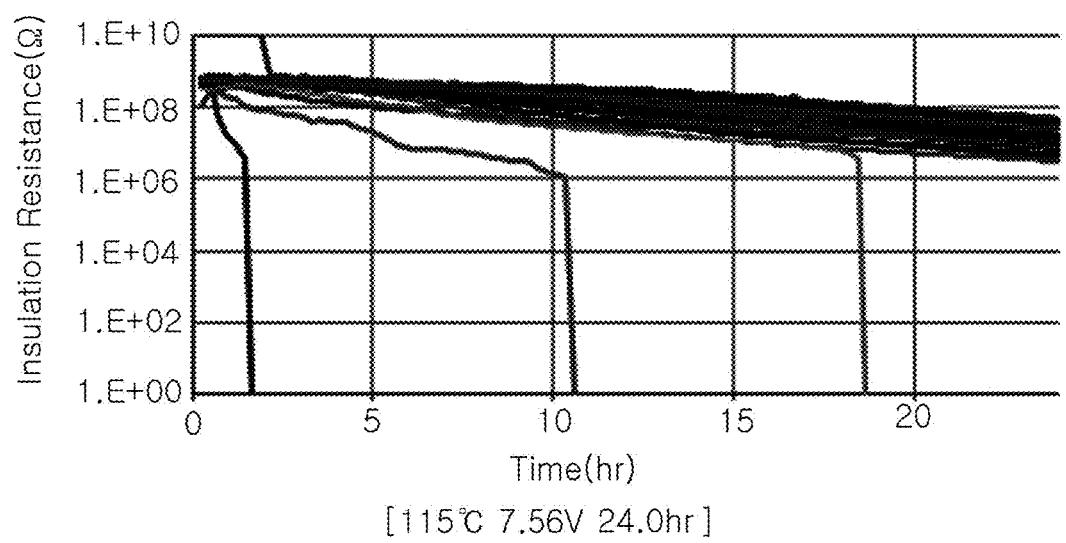
FIGS. 10A, 10B, and 10C are graphs illustrating results of HALT reliability evaluation according to heat treatment conditions.
Figure 10B:
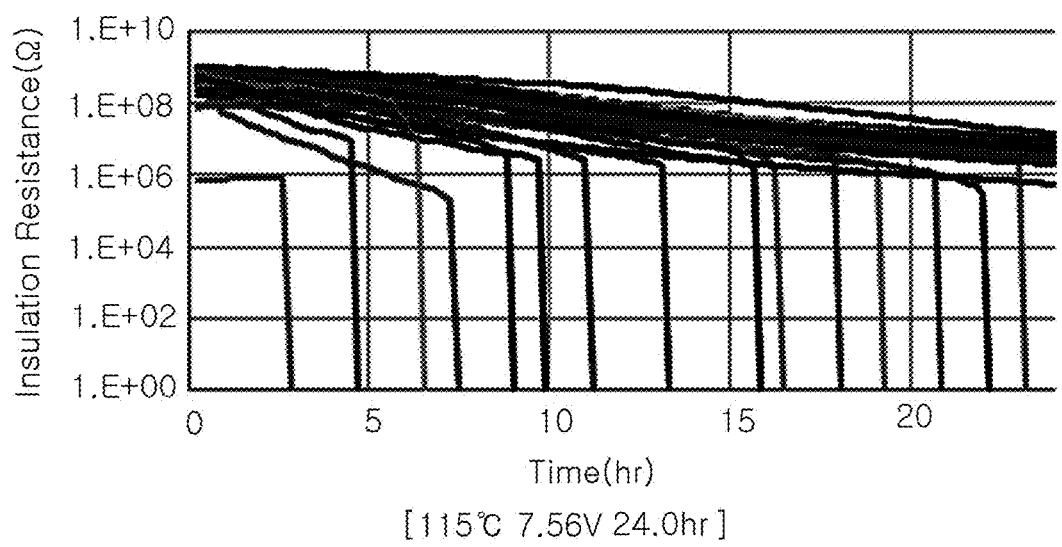
Figure 10C:
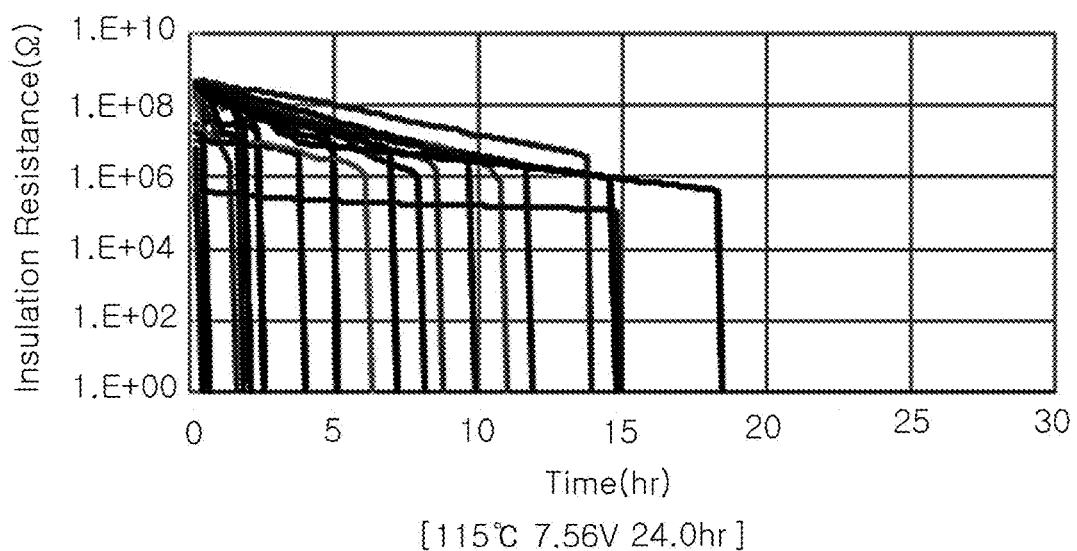

FIGS. 10A, 10B, and 10C are graphs illustrating results of HALT reliability evaluation according to heat treatment conditions.

When an operation (S4) of forming a body including a dielectric layer and an internal electrode alternately disposed with the dielectric layer by reoxidizing a sintered laminate to be described below at a temperature lower than a sintering temperature in an oxidizing atmosphere is performed, thickness distribution of the dielectric layer may be determined depending on a re-oxidation temperature, resulting in a difference in HALT reliability.

FIG. 10A illustrates a HALT reliability evaluation of a multilayer electronic component including a body manufactured by performing re-oxidation at a temperature of 92.4% of the sintering temperature, FIG. 10B illustrates a HALT reliability evaluation of a multilayer electronic component including a body manufactured by performing re-oxidation at a temperature of 94.1% of the sintering temperature, and FIG. 10C illustrates a HALT reliability evaluation of a multilayer electronic component including a body manufactured by performing re-oxidation at a temperature of 95.8% of the sintering temperature.

Referring to FIGS. 10A, 10B, and 10C, it can be seen that fail is only 11% in the HALT reliability evaluation in FIG. 10A in which a re-oxidation temperature is 92.4% or less of the sintering temperature, whereas fail is 38% or more in the HALT reliability evaluation in FIGS. 10B and 10C in which a re-oxidation temperature exceeds 92.4% of the sintering temperature.

A body may be manufactured by performing re-oxidation at a temperature of 92.4% of the sintering temperature. In this case, when an average thickness of the dielectric layer is represented by td and an average thickness of the dielectric layer having a lower 1% thickness of the dielectric layer is represented by t2, td≥0.69 may be satisfied. When the average thickness of the dielectric layer is represented by td and a minimum thickness of the dielectric layer is represented by t3, t3/td≥0.62 may be satisfied. Accordingly, it is possible to improve HALT reliability by minimizing the formation of a structurally weak dielectric layer.

In some embodiments, the additive may include terbium (Tb). In an example embodiment, the additive may be terbium (Tb). When an average thickness of the dielectric layer is represented by td and an average thickness of the dielectric layer having a lower 1% thickness of the dielectric layer is represented by t2, t2/td≥0.69 may be satisfied. In an example embodiment, the additive may be terbium (Tb). When the average thickness of the dielectric layer is represented by td and a minimum thickness of the dielectric layer is represented by t3, t3/td≥0.62 may be satisfied.

Accordingly, the formation of a structurally weak dielectric layer caused by high re-oxidation temperature may be minimized, thereby improving HALT reliability of a multiplayer electronic component.

The average thickness td of the dielectric layer, the average thickness t2 of the dielectric layer having a lower 1% thickness of the dielectric layer, and the minimum thickness t3 of the dielectric layer may be measured by the same method as the method for measuring the average grain size of the plurality of dielectric grains.

In addition, the thickness of each of the cover portions 112 and 113 is not specifically limited. However, in order to more easily achieve miniaturization and implementation of high capacitance of the multilayer electronic component, a thickness tp of the cover portions 112 and 113 may be 20 μm or less.

The external electrodes 131 and 132 may be disposed on the body 110, and may be connected to the internal electrodes 121 and 122.

As illustrated in FIG. 2, first and second external electrodes 131 and 132 respectively disposed on the third and fourth surfaces 3 and 4 of the body 110 to be respectively connected to the first and second internal electrodes 121 and 122 may be included.

In the present example embodiment, a structure in which the multilayer electronic component 100 includes two external electrodes 131 and 132 is described. However, the number, shape, or the like of the external electrodes 131 and 132 may vary depending on the shape of the internal electrodes 121 and 122, or other purposes.

The external electrodes 131 and 132 may be formed of any material as long as it has electrical conductivity, such as a metal or the like, and a specific material may be determined in consideration of electrical characteristics, structural stability, and the like. Furthermore, the external electrodes 131 and 132 may have a multilayer structure.

For example, the external electrodes 131 and 132 may include electrode layers 131a and 132a disposed on the body 110, and plating layers 131b and 132b formed on the electrode layers 131a and 132a.

As a more specific example of the electrode layers 131a and 132a, the electrode layers 131a and 132a may be sintered electrodes including a conductive metal and glass, or resin-based electrodes including a conductive metal and a resin.

In addition, the electrode layers 131a and 132a may have a form in which a sintered electrode and a resin-based electrode are sequentially formed on a body. In addition, the electrode layers 131a and 132a may be formed by transferring a sheet including a conductive metal onto the body or by transferring a sheet including a conductive metal onto the sintered electrode.

As the conductive metal included in the electrode layers 131a and 132a, a material having excellent electrical conductivity may be used, but is not particularly limited. For example, the conductive metal may be one or more of nickel (Ni), copper (Cu), and an alloy thereof.

As a more specific example of the plating layers 131b and 132b, the plating layers 131b and 132b may be an Ni plating layer or an Sn plating layer, and may have a form in which the Ni plating layer and the Sn plating layer are sequentially formed on the electrode layers 131a and 132a, and may have a form in which the Sn plating layer, the Ni plating layer, and the Sn plating layer are sequentially formed. In addition, the plating layers 131b and 132b may include a plurality of Ni plating layers and/or a plurality of Sn plating layers.

A size of the multilayer electronic component 100 is not particularly limited.

However, in order to achieve miniaturization and implementation of high capacitance at the same time, it may be required to reduce a thickness of each of a dielectric layer and an internal electrode so as to increase the number of laminates. Thus, a multilayer electronic component having a size of 0603 (length×width, 0.6 mm×0.3 mm) or less may have a more significant effect of improving reliability and insulation resistance according to the present disclosure.

Accordingly, when a distance between third and fourth surfaces of the body is defined as L and a distance between fifth and sixth surfaces as W, L may be 0.6 mm or less, and W may be 0.3 mm or less. That is, it may be a multilayer electronic component having a size of 0603 (length×width, 0.6 mm×0.3 mm) or less.

Method for Manufacturing Multilayer Electronic Component

Figure 11:
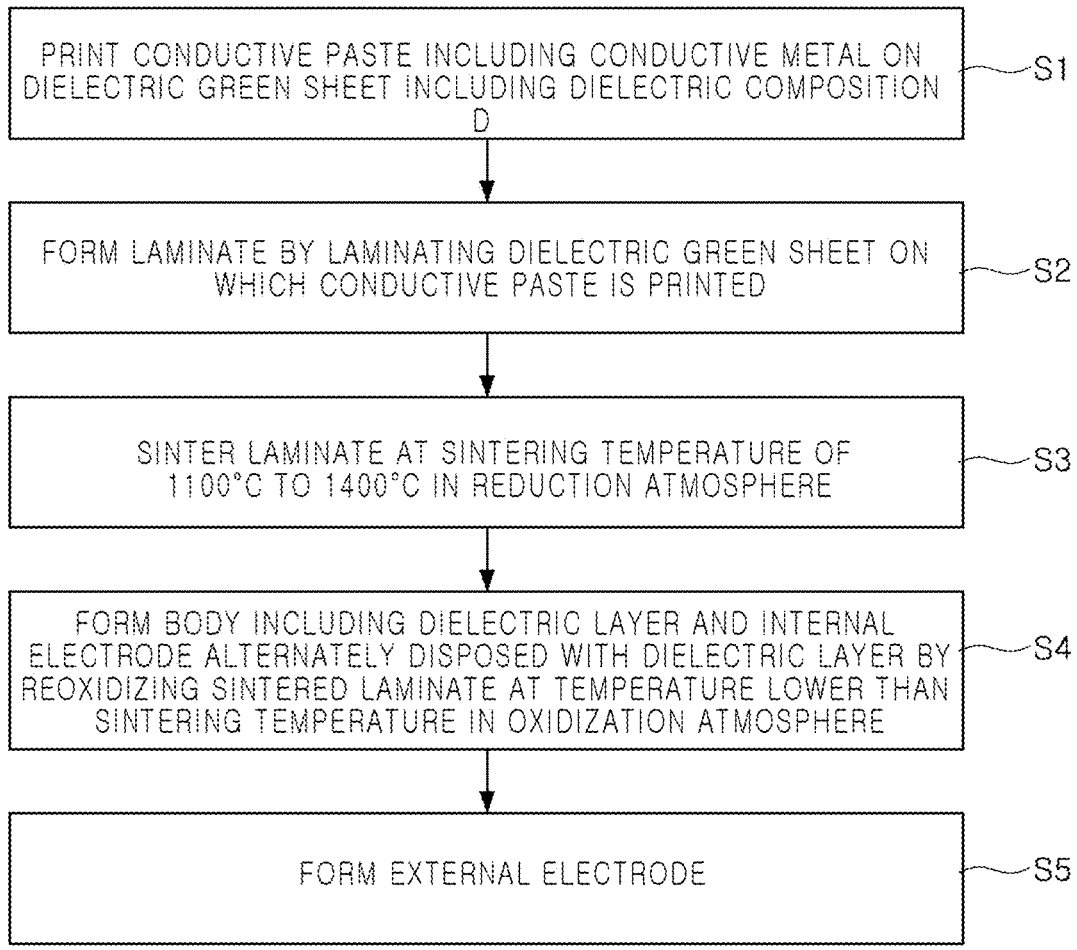
FIG. 11 is a schematic diagram illustrating a method for manufacturing a multilayer electronic component according to an example embodiment of the present disclosure.

FIG. 11 is a schematic diagram illustrating a method for manufacturing a multilayer electronic component according to an example embodiment of the present disclosure.

Hereinafter, a method for manufacturing a multilayer electronic component according to an example embodiment of the present disclosure is described in detail with reference to FIG. 11, but descriptions overlapping those of the dielectric composition and the multilayer electronic component are omitted.

A method for manufacturing a multilayer electronic component according to an example embodiment of the present disclosure may include an operation (S1) of printing a conductive paste including a conductive metal on a dielectric green sheet including a dielectric composition; an operation (S2) of forming a laminate by laminating the dielectric green sheet on which the conductive paste is printed; an operation (S3) of sintering the laminate at a sintering temperature of 1100° C. to 1400° C. in a reducing atmosphere; an operation (S4) of forming a body including a dielectric layer and an internal electrode alternately disposed with the dielectric layer by reoxidizing the sintered laminate at a temperature lower than the sintering temperature in an oxidizing atmosphere; and an operation (S5) of forming an external electrode disposed on the body. The dielectric composition may include a $BaTiO_3$-based base material main ingredient, a sub-ingredient including Dy, and an additive including one or more of Sm, Gd, and Tb, and a content of the additive may be 25 mol or more and less than 50 mol relative to 100 mol of Dy.

The method for manufacturing a multilayer electronic component according to an example embodiment of the present disclosure may include the operation (S1) of printing a conductive paste including a conductive metal on a dielectric green sheet including a dielectric composition.

According to an example embodiment of the present disclosure, a dielectric green sheet including a dielectric composition may be provided. The dielectric green sheet may be obtained by mixing a ceramic powder, a binder, a solvent, and the like to prepare a slurry, and manufacturing the slurry in the form of a sheet having a thickness of several μm through a doctor blade method. The ceramic green sheet may then be sintered to form one dielectric layer 111, as illustrated in FIG. 2.

The dielectric composition included in the dielectric green sheet may have the same ingredients as those of the above-described dielectric composition of the present disclosure.

Subsequently, an internal electrode pattern may be formed by applying a conductive paste including a conductive metal on the dielectric green sheet. A method for forming the internal electrode pattern is not particularly limited, but may be formed by a screen printing method or a gravure printing method.

Thereafter, the method may include the operation (S2) of forming a laminate by laminating the dielectric green sheet on which the conductive paste is printed.

The green sheet on which the internal electrode pattern is printed may be laminated and compressed by pressing from a lamination direction. Accordingly, a laminate in which the internal electrode pattern is formed may be formed.

Subsequently, the method may include the operation (S3) of sintering the laminate at a sintering temperature of 1100° C. to 1400° C. in a reducing atmosphere. In some embodiments, the reducing atmosphere may include hydrogen and may be free of oxygen.

The laminate may be cut for each region corresponding to one multilayer electronic component. In this case, one end of the internal electrode pattern may be cut so as to be alternately exposed through a side surface thereof. Thereafter, the chipped laminate may be sintered. The sintering process may be performed in a reducing atmosphere, and a preferred sintering temperature may be 1100° C. to 1400° C. In addition, the sintering process may be performed by adjusting a heating rate.

Subsequently, the method may include the operation (S4) of forming a body including a dielectric layer and an internal electrode alternately disposed with the dielectric layer by reoxidizing the sintered laminate at a temperature lower than the sintering temperature in an oxidizing atmosphere. In some embodiments, the oxidizing atmosphere may include more oxygen than hydrogen.

When the internal electrode includes Ni, the sintering process may be performed in a reducing atmosphere so as to prevent oxidation of Ni. Accordingly, a large number of oxygen vacancy defects may occur in the dielectric layer.

Such oxygen vacancy defects may semiconductorize the dielectric layer, and reduce reliability. Accordingly, the operation (S4) of reoxidizing the sintered laminate in an oxidizing atmosphere so as to compensate for the oxygen vacancy defects formed in large number may be performed.

In this case, the re-oxidation operation may be performed at a temperature lower than the sintering temperature. Accordingly, it is possible to suppress a phenomenon of additional sintering of the dielectric layer and the internal electrode to prevent the formation of a structurally weak dielectric layer, thereby improving reliability of the multilayer electronic component.

As described in connection with the multilayer electronic component according to an example embodiment of the present disclosure, a temperature at which a laminate is re-oxidized in an oxidizing atmosphere may be preferably 92.4% or less of the sintering temperature. In some embodiments, the temperature at which a laminate is re-oxidized in an oxidizing atmosphere may be more than 0% and 92.4% or less of the sintering temperature. When the re-oxidation temperature exceeds 92.4% of the sintering temperature, there may be a concern for HALT reliability reduced due to excessive additional sintering of the dielectric layer and the internal electrode.

A lower limit of the temperature at which the laminate is re-oxidized in an oxidizing atmosphere is not particularly limited. However, in order to sufficiently compensate for the oxygen defects formed in the dielectric layer after the sintering process, the re-oxidation temperature may be preferably 76% or more of the sintering temperature.

According to an example embodiment, the operation (S4) of forming a body including a dielectric layer and an internal electrode alternately disposed with the dielectric layer by reoxidizing the sintered laminate at a temperature lower than the sintering temperature in an oxidizing atmosphere may be performed at a temperature of 92.4% or less of the sintering temperature, thereby suppressing the formation of a structurally weak dielectric layer, and improving HALT reliability.

Subsequently, the method may include the operation (S5) of forming an external electrode disposed on the body. In this case, the external electrode may be formed to cover a side surface of the body and to be electrically connected to the internal electrode exposed to the side surface of the body. The external electrode may be formed of a single layer or a plurality of layers, and a formation method and ingredients thereof may be the same as described above.

EXAMPLE

Table 1 below shows results of measuring a microstructure of a dielectric layer after sintering (sintering temperature of 1190° C.) depending on a type of additive included in a dielectric composition, and evaluating insulation resistance distribution of initial HALT reliability evaluation.

A multilayer electronic component evaluated in Test Nos. 1 to 4 of Table 1 below was formed by performing re-oxidization (heat treatment condition: LT) at a temperature of 92.4% or less of a sintering temperature according to the method for manufacturing a multilayer electronic component according to an example embodiment of the present disclosure.

As described above, in order to obtain an average grain size G of a plurality of dielectric grains, an arithmetic mean value was calculated by capturing, with an SEM, an image of a cross-section in a first direction-third direction (WT cross-section) of a capacitance formation portion, and then measuring, along the third direction, a size of each grain at ten sites using an image analysis program (Image-Pro Plus version 4.5 made by Media cybernetics Inc.). Positions of the ten sites were disposed at ten equally spaced apart sites in a W-axis direction with respect to a cut surface passing through a central portion of the multilayer electronic component while being perpendicular to a T-axis of the multilayer electronic component.

As described above, in order to obtain an average thickness td of a dielectric layer, with respect to an arbitrary dielectric layer 111 extracted from an image obtained by scanning, with the SEM, a cross-section in third and first directions (W-T cross-section) cut from a central portion in a second direction (L-direction) of the body 110, the thickness of the dielectric layer 111 was measured at thirty points equally spaced apart in the third direction to obtain an average value. Other methods and/or tools appreciated by one of ordinary skill in the art, even if not described in the present disclosure, may also be used.

In order to evaluate insulation resistance distribution of initial HALT reliability evaluation, a voltage of 7.56V was applied for 72.0 hr in a high temperature environment of 115° C. In an initial (0 hr to 10 hr) section, the insulation resistance distribution was evaluated as "excellent" when a standard deviation/average (coefficient of variation, also known as CV) value of insulation resistance was 0.3 or less, the insulation resistance distribution was evaluated as "good" when the standard deviation/average (CV) value of insulation resistance was 0.6 or less, and the insulation resistance distribution was evaluated as "poor" when the standard deviation/average (CV) value of insulation resistance exceeded 0.6.

TABLE 1

| Test No. | Content (mol) of additives relative to 100 mol of Dy | | | Heat treatment condition | Microstructure | | HALT reliability evaluation Distribution |
|---|---|---|---|---|---|---|---|
| | Tb | Gd | Sm | | G (nm) | td/G | |
| 1 | 0 | 0 | 0 | LT | 217 | 1.61 | Poor |
| 2 | 25 | 0 | 0 | LT | 200 | 1.75 | Good |
| 3 | 0 | 25 | 0 | LT | 172 | 2.03 | Good |
| 4 | 0 | 0 | 25 | LT | 157 | 2.23 | Excellent |

Test No. 1 corresponded to a case in which Dy was included as a sub-ingredient, and corresponded to a case in which an additive element was not added.

Test Nos. 2 to 4 corresponded to a case in which a sub-ingredient included Dy, and corresponded to a case in which 25 mol of an additive element was added relative to 100 mol of Dy.

According to Table 1, it can be seen that an average grain size of a dielectric layer is reduced toward a Sm element (Test No. 4) reducing a value of a Goldschmidt structural factor (t) with a perovskite structure, and the number of grains for one dielectric layer (td/G) is increased.

Test No. 1 corresponded to a case in which no additive was added and the dielectric composition included Dy as a sub-ingredient. It can be seen that the insulation resistance distribution of the initial HALT reliability evaluation was "poor" when an average grain size of a plurality of dielectric grains of a dielectric layer exceeded 200 nm after sintering, and the number of grains for one dielectric layer (td/G) was less than 1.75.

Test No. 2 corresponded to a case in which the dielectric composition included Dy as a sub-ingredient, and included 25 mol of Tb relative to 100 mol of Dy as an additive. Test No. 3 corresponded to a case in which the dielectric composition included Dy as a sub-ingredient, and included 25 mol of Gd relative to 100 mol of Dy as an additive. Test No. 4 corresponded to a case in which the dielectric composition included Dy as a sub-ingredient, and included 25 mol of Sm relative to 100 mol of Dy as an additive.

In Test Nos. 2 to 4, it can be seen that the insulation resistance distribution of the initial HALT reliability evaluation was "good" or "excellent" when an average grain size G of a plurality of dielectric grains of a dielectric layer after sintering was 157 nm or more and 200 nm or less, or the number of grains for one dielectric layer (td/G) was 1.75 or more and 2.23 or less.

Accordingly, a dielectric layer of a multilayer electronic component according to an example embodiment may include a plurality of dielectric grains, and an average grain size of the plurality of dielectric grains may be adjusted to be 157 nm or more and 200 nm or less, and accordingly a grain of the dielectric layer may be atomized, thereby improving reliability and improving insulation resistance distribution.

In addition, the dielectric layer of the multilayer electronic component according to an example embodiment includes a plurality of dielectric grains. When an average grain size of the plurality of dielectric grains is represented by G and an average thickness of the dielectric layer is represented by td, $1.75 \leq td/G \leq 2.23$ may be satisfied, and accordingly a grain of the dielectric layer may be atomized, thereby improving reliability and improving insulation resistance distribution.

Table 2 below shows results of measuring a microstructure of a dielectric layer and evaluating HLT reliability after manufacturing a multilayer electronic component by differently applying re-oxidization heat treatment conditions of the operation (S4) of forming a body including a dielectric layer and an internal electrode alternately disposed with the dielectric layer by reoxidizing the sintered laminate at a temperature lower than the sintering temperature in an oxidizing atmosphere, when Tb is included as an additive.

The re-oxidation heat treatment conditions were divided into LT, which was 92.4% of the sintering temperature, IT, which was 94.1% of the sintering temperature, and HT, which was 95.8% of the sintering temperature.

The HALT reliability evaluation in Table 2 below was performed by applying a voltage of 7.56V for 72.0 hr in a high-temperature environment of 115° C. with respect to 400 multilayer electronic component samples, and a ratio (HALT Fail %) of the number of multilayer electronic components in which insulation breakdown (Fail) occurs was measured.

TABLE 2

| Test No. | Heat treatment condition | Microstructure | | HALT Fail % |
|---|---|---|---|---|
| | | t2/td | t3/td | |
| 1 | LT | 0.69 | 0.62 | 11% |
| 2 | IT | 0.68 | 0.60 | 38% |
| 3 | HT | 0.61 | 0.55 | 100% |

Test No. 1 corresponded to a case in which a heat treatment condition was LT. In a microstructure after sintering, it can be seen that t2/td was 0.69, t3/td was 0.62, and HALT Fail % was 11%. Accordingly, it can be seen that HALT reliability may be improved by suppressing the formation of a structurally weak dielectric caused by high re-oxidation temperature.

Test No. 2 corresponded to a case in which a heat treatment condition was IT. In a microstructure after sintering, it can be seen that t2/td was 0.68, t3/td was 0.60, and HALT Fail % was 38%. In addition, Test No. 3 corresponded to a case in which a heat treatment condition was HT. In a microstructure after sintering, it can be seen that t2/td was 0.61, t3/td was 0.55, and HALT Fail % was 100%. That is, in Test Nos. 2 and 3, a re-oxidation temperature was high, and thus excessive sintering was induced in a dielectric and an internal electrode, thereby forming a structurally weak dielectric layer. Accordingly, it can be seen that the HALT Fail % increased.

In addition, in a method for manufacturing a multilayer electronic component according to an example embodiment, a temperature at which a laminate is re-oxidized in an oxidizing atmosphere may be adjusted to be 92.4% or less of a sintering temperature to suppress the formation of a structurally weak dielectric layer, thereby improving HALT reliability.

In addition, in the multilayer electronic component according to an example embodiment, when an average thickness of a dielectric layer is represented by td, an average thickness of the dielectric layer having a lower 1% thickness of the dielectric layer is represented by t2, and a minimum thickness of the dielectric layer is represented by t3, t2/td≥0.69 and t3/td≥0.62 may be satisfied. Accordingly, it is possible to minimize a proportion of a structurally weak dielectric layer, thereby improving HALT reliability.

While example embodiments have been shown and described above, it will be apparent to those skilled in the art that modifications and variations could be made without departing from the scope of the present invention as defined by the appended claims.

In addition, the term "an example embodiment" does not refer to the same example embodiment, and describe different unique features of various example embodiments. However, the above-suggested example embodiments may also be implemented to be combined with a feature of another example embodiment. For example, even when a content described with respect to an example embodiment is not described in another example embodiment, it may be understood as a description related to the other example embodiment unless described to the contrary or contradictory in the other example embodiment.

The terms used herein are used to describe only one example embodiment, and are not intended to limit the present disclosure. In this case, the singular forms "a," "an," and "the" are intended to include the plural forms as well, unless the context clearly indicates otherwise.

What is claimed is:

1. A multilayer electronic component comprising:
a body including a dielectric layer and an internal electrode alternately disposed with the dielectric layer; and
an external electrode disposed on the body,
wherein the dielectric layer includes a dielectric composition and a plurality of dielectric grains,
the dielectric composition includes a $BaTiO_3$-based base material main ingredient, a sub-ingredient including Dy, and an additive,
the additive includes one or more of Sm, Gd, and Tb,
a content of the additive is 25 mol or more and less than 50 mol relative to 100 mol of Dy,
an average grain size of the plurality of dielectric grains is represented by G,
an average thickness of the dielectric layer is represented by td,
td≤0.35 μm, and
1.75≤td/G≤2.23 is satisfied.

2. The multilayer electronic component of claim 1, wherein
the average grain size of the plurality of dielectric grains is 157 nm or more and 200 nm or less.

3. The multilayer electronic component of claim 1, wherein
the additive includes Tb,
the body includes a plurality of dielectric layers and an average thickness of the dielectric layer having a thickness value at lower one percentile in distribution of thickness values of the plurality of dielectric layers is represented by t2, and
t2/td≥0.69 is satisfied.

4. The multilayer electronic component of claim 1, wherein
the additive includes Tb,
a minimum thickness of the dielectric layer is represented by t3, and
t3/td≥0.62 is satisfied.

5. A method for manufacturing a multilayer electronic component, the method comprising:
printing a conductive paste including a conductive metal on a dielectric green sheet including a dielectric composition;
forming a laminate by laminating the dielectric green sheet on which the conductive paste is printed;
sintering the laminate at a sintering temperature of 1100° C. to 1400° C. in a reducing atmosphere;
forming a body including a dielectric layer and an internal electrode alternately disposed with the dielectric layer by reoxidizing the sintered laminate in an oxidizing atmosphere at a temperature lower than the sintering temperature; and
forming an external electrode disposed on the body,
wherein the dielectric composition includes a $BaTiO_3$-based base material main ingredient, a sub-ingredient including Dy, and an additive including one or more of Sm, Gd, and Tb,
a content of the additive is 25 mol or more and less than 50 mol relative to 100 mol of Dy.

6. The method of claim 5, wherein the temperature at which the sintered laminate is re-oxidized in the oxidizing atmosphere is 92.4% or less of the sintering temperature.

7. The method of claim 5, wherein
the dielectric layer includes a plurality of dielectric grains,
an average grain size of the plurality of dielectric grains is represented by G, and
$1.75 \leq td/G \leq 2.23$ is satisfied.

8. The method of claim 5, wherein
the dielectric layer includes a plurality of dielectric grains, and
an average grain size of the plurality of dielectric grains is 157 nm or more and 200 nm or less.

9. The method of claim 5, wherein
the additive includes Tb,
the body includes a plurality of dielectric layers and an average thickness of the dielectric layer having a thickness value at lower one percentile in distribution of thickness values of the plurality of dielectric layers is represented by t2, and
$t2/td \geq 0.69$ is satisfied.

10. The method of claim 5, wherein
the additive includes Tb,
a minimum thickness of the dielectric layer is represented by t3, and
$t3/td \geq 0.62$ is satisfied.

11. A multilayer electronic component comprising:
a body including a dielectric layer and an internal electrode alternately disposed with the dielectric layer; and
an external electrode disposed on the body,
wherein the dielectric layer includes a dielectric composition and a plurality of dielectric grains,
the dielectric composition includes Dy, and an additive that includes one or more of Sm, Gd, and Tb,
a content of the additive is more than 0 mol and less than 50 mol relative to 100 mol of Dy, and
wherein the an average thickness of the dielectric layer, td satisfies $td \leq 0.35$ μm.

12. The multilayer electronic component of claim 11, wherein the content of the additive is 25 mol or more and less than 50 mol relative to 100 mol of Dy.

13. The multilayer electronic component of claim 11, wherein the dielectric composition further includes a $BaTiO_3$-based base material main ingredient.

14. The multilayer electronic component of claim 11, wherein
an average grain size of the plurality of dielectric grains is represented by G, and
$1.75 \leq td/G \leq 2.23$ is satisfied.

15. The multilayer electronic component of claim 14, wherein
the additive includes Tb,
a minimum thickness of the dielectric layer is represented by t3, and
$t3/td \geq 0.62$ is satisfied.

16. The multilayer electronic component of claim 15, wherein the additive is Tb.

17. The multilayer electronic component of claim 11, wherein an average grain size of the plurality of dielectric grains is 157 nm or more and 200 nm or less.

18. The multilayer electronic component of claim 11, wherein the additive comprises Tb.

19. The multilayer electronic component of claim 11, wherein the additive consists Tb.

20. The multilayer electronic component of claim 11, wherein the additive comprises Gd.

21. The multilayer electronic component of claim 11, wherein the additive consists Gd.

22. The multilayer electronic component of claim 11, wherein the additive comprises Sm.

23. The multilayer electronic component of claim 11, wherein the additive consists Sm.

\* \* \* \* \*